April 5, 1927.

G. B. HOSLER 1,623,679

HOT DISH LIFTER

Filed April 9, 1925

Inventor.
Grace B. Hosler
by Heard Smith & Tennant.
Attys.

Patented Apr. 5, 1927.

1,623,679

UNITED STATES PATENT OFFICE.

GRACE B. HOSLER, OF REEDSBURG, WISCONSIN.

HOT-DISH LIFTER.

Application filed April 9, 1925. Serial No. 21,831.

This invention relates to a hot dish lifter and has for its object to provide a novel implement of this nature which may be used not only to take hot plates and similar dishes from ovens or from the tops of stoves but may also be used for lifting out of a kettle a dish which is of less height than the kettle.

Other objects of the invention are to improve hot dish lifters in various respects all as will be more fully hereinafter set forth.

In order to give an understanding of the invention I have illustrated in the drawings a selected embodiment thereof which will now be described after which the novel features will be pointed out in the appended claim.

Figure 1:
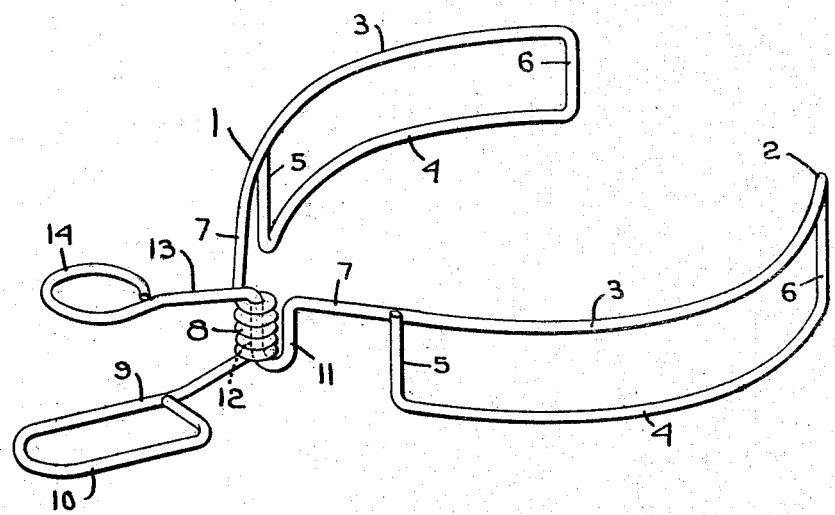
Fig. 1 is a perspective view of a hot dish lifter embodying my invention.

My improved hot dish lifter comprises two jaws or arms which are connected together for movement toward and from each other. Each jaw or arm is made of wire and is of special shape designed to permit it to be used not only for taking a plate or a shallow dish from an oven or from the top of a stove but also for lifting a bowl or similar dish out of a kettle.

The two arms are designated generally by 1 and 2 and each is made of wire and is provided with an upper bar or portion 3 and a lower bar or portion 4, the two bars of each jaw being substantially parallel. Both are curved slightly so as to fit around the dish as usual in hot dish lifters. The lower bar 4 of each arm is connected at each end to the upper bar, such connections being shown at 5 and 6.

In forming each jaw from wire the wire may be bent to form the upper bar 3 and then may be bent downwardly to form the connection 6 and then bent to form the lower bar 4, the end of the wire being bent upwardly to form the connection 5, the end of which is secured to the bar 3 by welding or in any other suitable way. The upper bar 3 of each arm is longer than the lower bar 4, each upper bar extending beyond the connection 5 as shown at 7. The two portions 7 of the two arms are connected together in some suitable way to permit the arms to move toward and from each other. One convenient way is to pivotally connect the arms, in which case they will be extended beyond the pivotal connection to form handles so that the device may be opened and closed scissors fashion.

As herein shown the upper bar of the arm 1 is formed into a coil 8 which forms one member of the pivotal connection, the wire of which the pivotal member is formed being then extended to form a handle 9 which is provided with a finger-receiving loop 10. The upper bar of the arm 2 beyond the portion 7 is bent downwardly as shown at 11 to a point below the coil 8 and then upwardly as shown at 12 through said coil, the end of the wire being extended as shown at 13 to form a handle which is provided with a thumb-receiving loop 14.

The arms are held in their proper relation by the lateral arm 13 engaging the top of the coil 8 and the loop of the U-shaped portion 11, 12 engaging the bottom of the coil 8. With this construction the upper bars 3 of the two arms occupy the same horizontal plane clear to the pivotal connection and the arm 9 is below the arm 13. This is a convenient arrangement because in using the device the operator will naturally insert the thumb of the right hand through the loop 14 and the fingers of the hand through the loop 10. By reason of the fact that the loop 14 is above the loop 10 the device is rendered more convenient to operate.

In using the device for lifting a hot plate from a stove or taking a hot plate from an oven the operator will open the jaws and then place them so as to embrace the edge of the plate, the rim of the plate resting on the lower bars 4. By closing the bars 4 against the plate the plate may be readily lifted and transported to any desired location.

Figure 2:
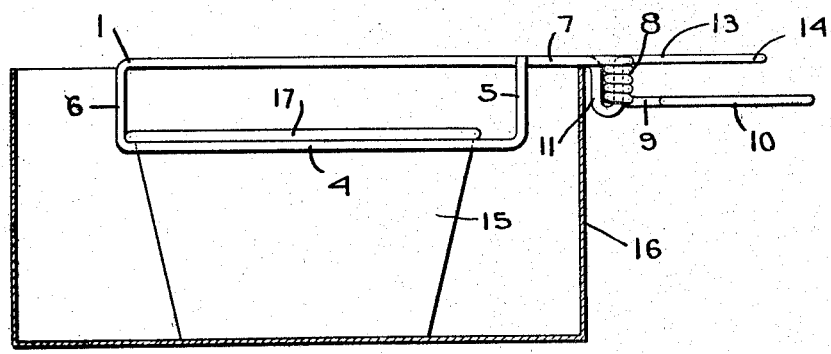
Fig. 2 shows the way in which the implement is used for lifting a bowl or other dish out of a kettle.

The device has been specially designed to facilitate the removal of a bowl or other dish 15 from a kettle or similar dish 16, especially where the inner dish has a less vertical dimension than the outer dish. In using the device for this purpose the jaws will be opened and placed in the outer dish or kettle 16 as shown in Fig. 2 with the portions 7 of the arms resting on the top edge of the dish 16. When in this position the bars 4 depend into the dish 16 so that by closing the jaws said bars will embrace the dish 15 below the rim 17 thereof. The dish 15 can thus be readily lifted from the kettle.

In lifting a kettle or a pan the jaws may be placed around the dish so that the upper bar 3 will come underneath the rim of the dish as desired.

A device embodying my invention is simple in construction and can be inexpensively manufactured. It is strong and durable and can also be used in a variety of ways as above described.

I claim:

A hot dish holder comprising two jaws each having an upper lifting bar and a lower lifting bar, the lower lifting bar being connected at each end to the upper lifting bar, the upper bar of one jaw extending beyond the corresponding lower bar and being formed into a coil which extends at right angles to the upper bar, the lower turn of the coil having rigid therewith a loop handle and the upper bar of the other jaw being extended beyond the corresponding lower bar and the extended portion being bent downwardly at right angles to the upper bar and then being bent upwardly to form a U-shaped portion, said upwardly bent portion extending through the coil and having integral with the upper end thereof a horizontally-extending handle portion, said downwardly bent portion being outside of the coil.

In testimony whereof, I have signed my name to this specification.

GRACE B. HOSLER.